(12) United States Patent
Shimomukai et al.

(10) Patent No.: US 11,740,209 B2
(45) Date of Patent: Aug. 29, 2023

(54) ULTRASONIC TESTING DEVICE AND TESTING METHOD

(71) Applicant: MITSUBISHI HEAVY INDUSTRIES, LTD., Tokyo (JP)

(72) Inventors: Takahito Shimomukai, Tokyo (JP); Jumpei Komoto, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 140 days.

(21) Appl. No.: 17/502,598

(22) Filed: Oct. 15, 2021

(65) Prior Publication Data

US 2022/0326191 A1  Oct. 13, 2022

(30) Foreign Application Priority Data

Apr. 13, 2021 (JP) .................... 2021-067798

(51) Int. Cl.
*G01N 29/265* (2006.01)
*G01N 29/04* (2006.01)
*G01N 29/28* (2006.01)

(52) U.S. Cl.
CPC .......... *G01N 29/265* (2013.01); *G01N 29/04* (2013.01); *G01N 29/28* (2013.01); *G01N 2291/0231* (2013.01); *G01N 2291/0289* (2013.01); *G01N 2291/106* (2013.01); *G01N 2291/2694* (2013.01)

(58) Field of Classification Search
CPC .... G01N 29/265; G01N 29/04; G01N 29/043; G01N 29/225; G01N 29/28; G01N 2291/2694; G01N 2291/0232; G01N 2291/106; G01N 2291/2636; G01N 2291/0289
USPC .......................................... 73/625
See application file for complete search history.

(56) References Cited

U.S. PATENT DOCUMENTS

| | | | |
|---|---|---|---|
| 8,333,115 B1 | 12/2012 | Garvey et al. | |
| 8,763,462 B1 | 7/2014 | Fetzer et al. | |
| 8,839,674 B2* | 9/2014 | Jones | G01N 29/225 73/866.5 |
| 9,423,381 B2 | 8/2016 | Jaramillo et al. | |
| 10,239,641 B2* | 3/2019 | Georgeson | B64F 5/60 |
| 10,718,740 B2* | 7/2020 | Takahashi | G01N 29/4436 |
| 11,044,011 B2* | 6/2021 | Georgeson | H04W 40/244 |
| 2009/0217763 A1* | 9/2009 | Yamano | G01N 29/043 73/622 |

* cited by examiner

*Primary Examiner* — Jacques M Saint Surin
(74) *Attorney, Agent, or Firm* — Manabu Kanesaka; Benjamin Hauptman; Kenneth Berner

(57) ABSTRACT

An ultrasonic testing device performs flaw detection on a stringer having an inner circumferential surface of a substantially rectangular shape closed in a transverse section. The ultrasonic testing device includes: a shoe configured to be in contact with a corner of the inner circumferential surface of the stringer; an ultrasonic array configured to be fixed to the shoe to define, together with the shoe and the corner a medium space in which a contact medium used for propagating an ultrasonic wave is enclosed, and configured to transmit an ultrasonic wave to the corner and receive a reflected ultrasonic wave; and a forcing unit configured to be in contact with a corner and push the shoe against the corner.

7 Claims, 7 Drawing Sheets

ULTRASONIC TESTING DEVICE AND TESTING METHOD

RELATED APPLICATIONS

The present application is based on, and claims priority from, Japanese Application No. JP2021-067798 filed Apr. 13, 2021, the disclosure of which is hereby incorporated by reference herein in its entirety.

BACKGROUND OF THE INVENTION

1. Field of the Invention

The present disclosure relates to an ultrasonic testing device and a testing method.

2. Description of Related Art

Composite materials may be applied to components constituting an aircraft. For example, in the main wings, hat-type stringer composite materials have been commonly used as reinforcement materials.

Such composite materials require nondestructive inspection such as ultrasonic testing, because internal flaws such as porosity may occur after curing.

However, the inner circumferential surface of a hat-type stringer as a test object has a substantially rectangular shape closed in a transverse section. Thus, when flaw detection of inside corners is required, access from outside of the stringer is difficult. For this reason, there is a problem in flaw detection of the inside corners.

As an ultrasonic testing method targeting such corners, there are methods disclosed in U.S. Pat. Nos. 9,423,381 and 8,763,462, for example.

U.S. Pat. Nos. 9,423,381 and 8,763,462 are examples of the related art.

Typical ultrasonic testing employs a water immersion method in which a test object is submerged in water and inspected. In this method, however, air bubbles that degenerate reliability of ultrasonic testing are likely to be attached to the surface of a test object, which requires removal operation of such air bubbles from the surface of the test object. Further, before submerging a test object, transportation or positioning operation of the test object is required.

In this regard, the method disclosed in U.S. Pat. No. 9,423,381 is an ultrasonic testing method using a gel pad, and this is a pulse-echo method to supply a small amount of water from a sponge when a gap occurs between a test object and the gel pad. This enables flaw detection without submerging a test object in water.

However, for a centering device provided with a probe, it is not possible to change the transverse sectional shape thereof. Thus, when there is a change in the transverse sectional shape of a test object, the centering device cannot follow such a change. Accordingly, the ultrasonic testing device disclosed in U.S. Pat. No. 9,423,381 is only applicable to test objects having a constant transverse sectional shape. Further, since gel pads are consumables, a problem remains also in terms of costs for secondary materials.

On the other hand, the ultrasonic testing device disclosed in U.S. Pat. No. 8,763,462 is configured to follow a change in the cross-sectional shape of a test object by employing an expansion/contraction mechanism.

However, in the ultrasonic testing method using this device disclosed in U.S. Pat. No. 8,763,462, a test object is required to be submerged in water, which causes the problem described above.

BRIEF SUMMARY OF THE INVENTION

The present disclosure has been made in view of such circumstances and intends to provide an ultrasonic testing device and a testing method that can realize a modified immersion (bubbler) method in which a test object is not required to be submerged in water, and that can perform flaw detection in a state where a shoe is suitably pressed against a corner of a test object even when there is a change in the transverse sectional shape of the inner circumferential surface of the test object.

To solve the problems described above, an ultrasonic testing device and a testing method of the present disclosure employ the following solutions.

An ultrasonic testing device according to one aspect of the present disclosure performs flaw detection on a test object having an inner circumferential surface of a substantially rectangular shape closed in a transverse section. The ultrasonic testing device includes: a shoe configured to be in contact with one corner of the inner circumferential surface of the test object; an ultrasonic array configured to be fixed to the shoe to define, together with the shoe and the one corner, a medium space in which a contact medium used for propagating an ultrasonic wave is enclosed, and configured to transmit an ultrasonic wave to the one corner and receive a reflected ultrasonic wave; and a forcing unit configured to be in contact with a diagonal corner of the one corner and push the shoe against the one corner.

Further, a testing method of a test object according to one aspect of the present disclosure uses an ultrasonic testing device including a shoe configured to be in contact with one corner of an inner circumferential surface of the test object having the inner circumferential surface of a substantially rectangular shape closed in a transverse section, an ultrasonic array configured to be fixed to the shoe to define, together with the shoe and the one corner, a medium space in which a contact medium used for propagating an ultrasonic wave is enclosed, and configured to transmit an ultrasonic wave to the one corner and receive an ultrasonic wave reflected by the one corner, and a forcing unit configured to be in contact with a diagonal corner of the one corner and push the shoe against the one corner. The testing method includes a step of performing flaw detection in a state where the shoe is in contact with the one corner of the test object and a contact medium is enclosed in the medium space.

According to the present disclosure, it is possible to realize a modified immersion (bubbler) method in which a test object is not required to be submerged in water and it is possible to perform flaw detection with a shoe being suitably pressed against a corner of a test object even when there is a change in the transverse sectional shape of the inner circumferential surface of the test object.

DETAILED DESCRIPTION OF THE INVENTION

An ultrasonic testing device and a testing method according to one embodiment of the present disclosure will be described below with reference to the drawings.

Figure 1:
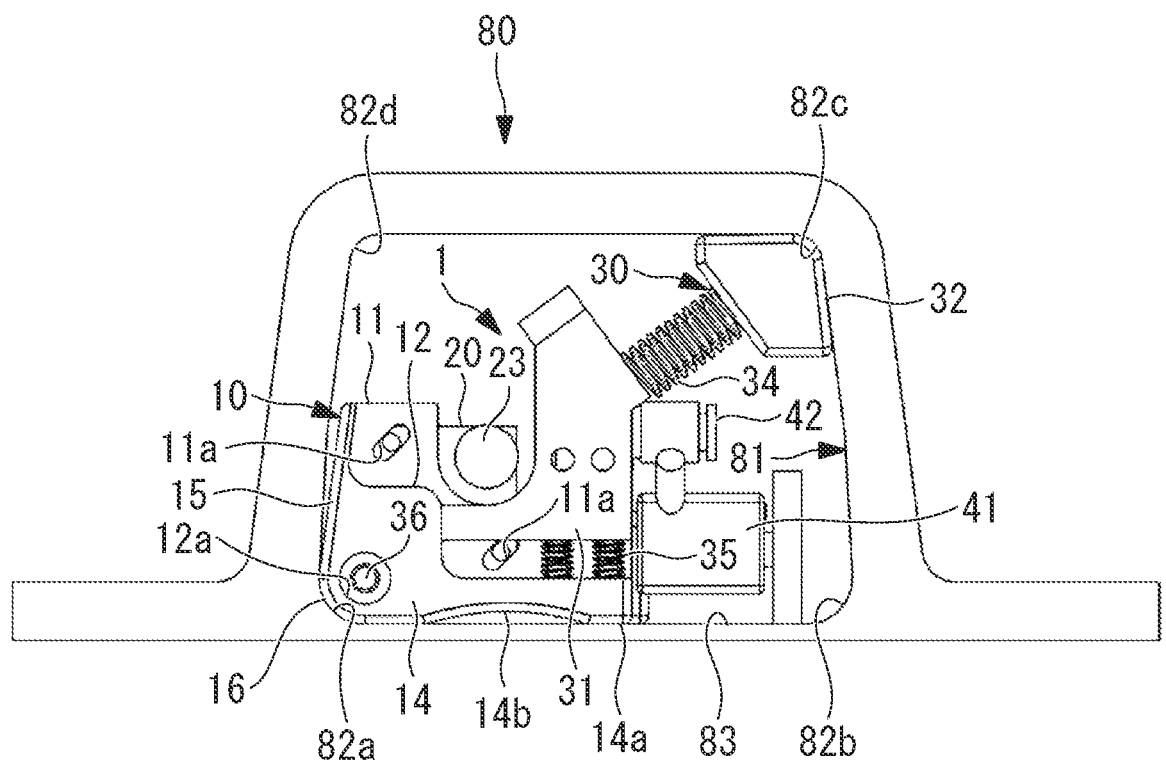
FIG. 1 is a side view illustrating a state where an ultrasonic testing device according to one embodiment of the present disclosure is installed in a stringer.
Figure 2:
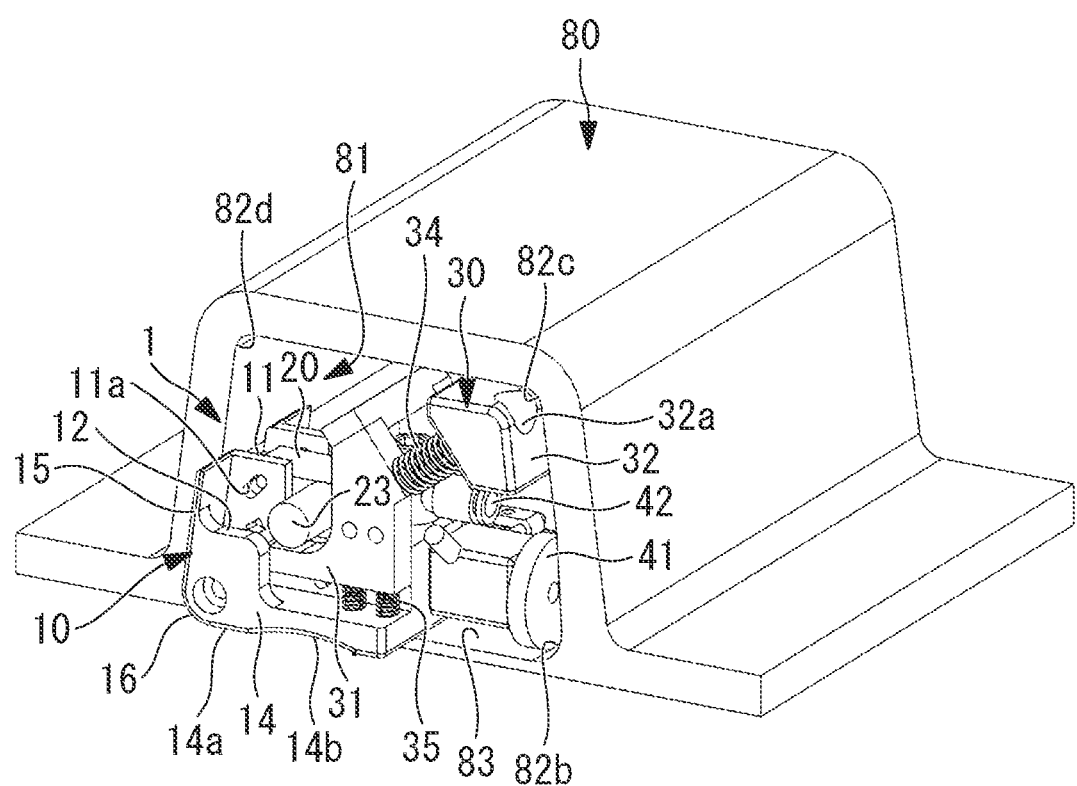
FIG. 2 is a side perspective view illustrating a state where the ultrasonic testing device according to one embodiment of the present disclosure is installed in the stringer.

As illustrated in FIG. 1 and FIG. 2, an ultrasonic testing device 1 performs flaw detection on an inner circumferential surface 81 of a stringer 80 as a test object.

The stringer 80 is a member applied to a reinforcement material of main wings of an aircraft, for example, and is made of a composite material such as a fiber-reinforced resin. The stringer 80 is of a so-called hat type and has the inner circumferential surface 81 of a substantially rectangular shape closed in the transverse section.

The substantially rectangular inner circumferential surface 81 has corners 82a, 82b, 82c, and 82d. The corners 82a, 82b, 82c, and 82d are each shaped in a circular arc having a predetermined radius.

Figure 3:
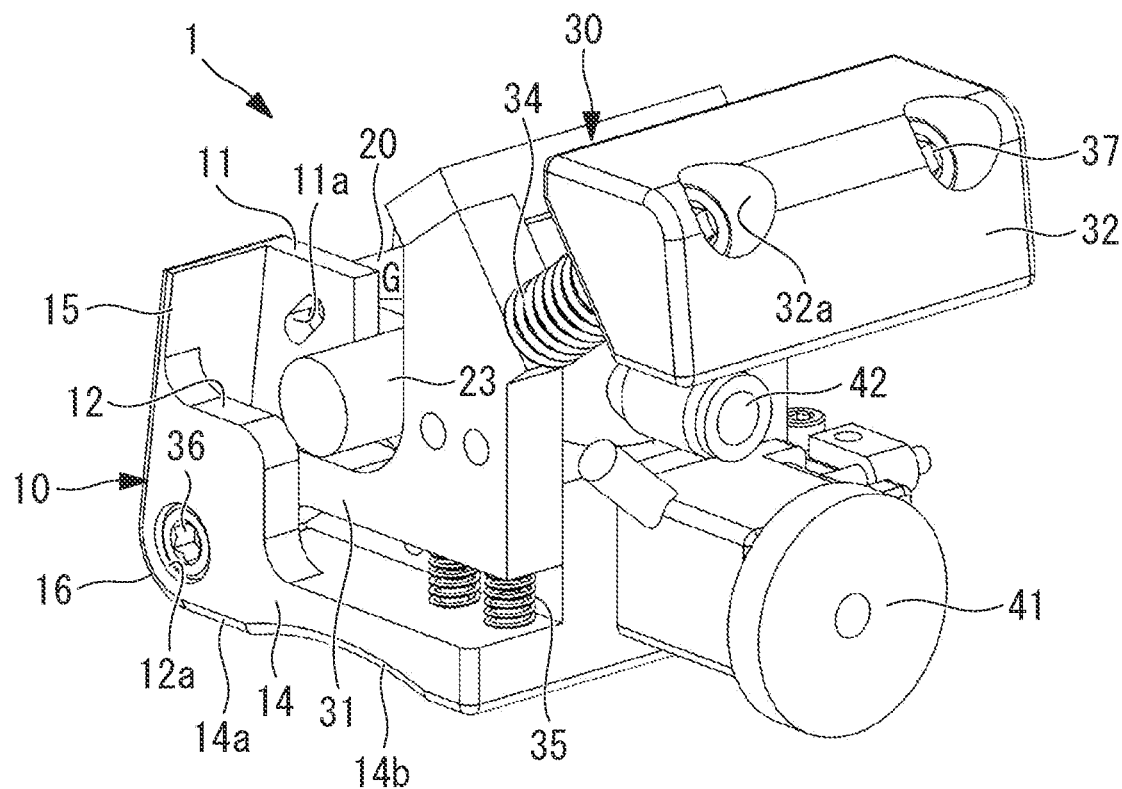
FIG. 3 is a perspective view of the ultrasonic testing device according to one embodiment of the present disclosure when viewed from above.
Figure 4:
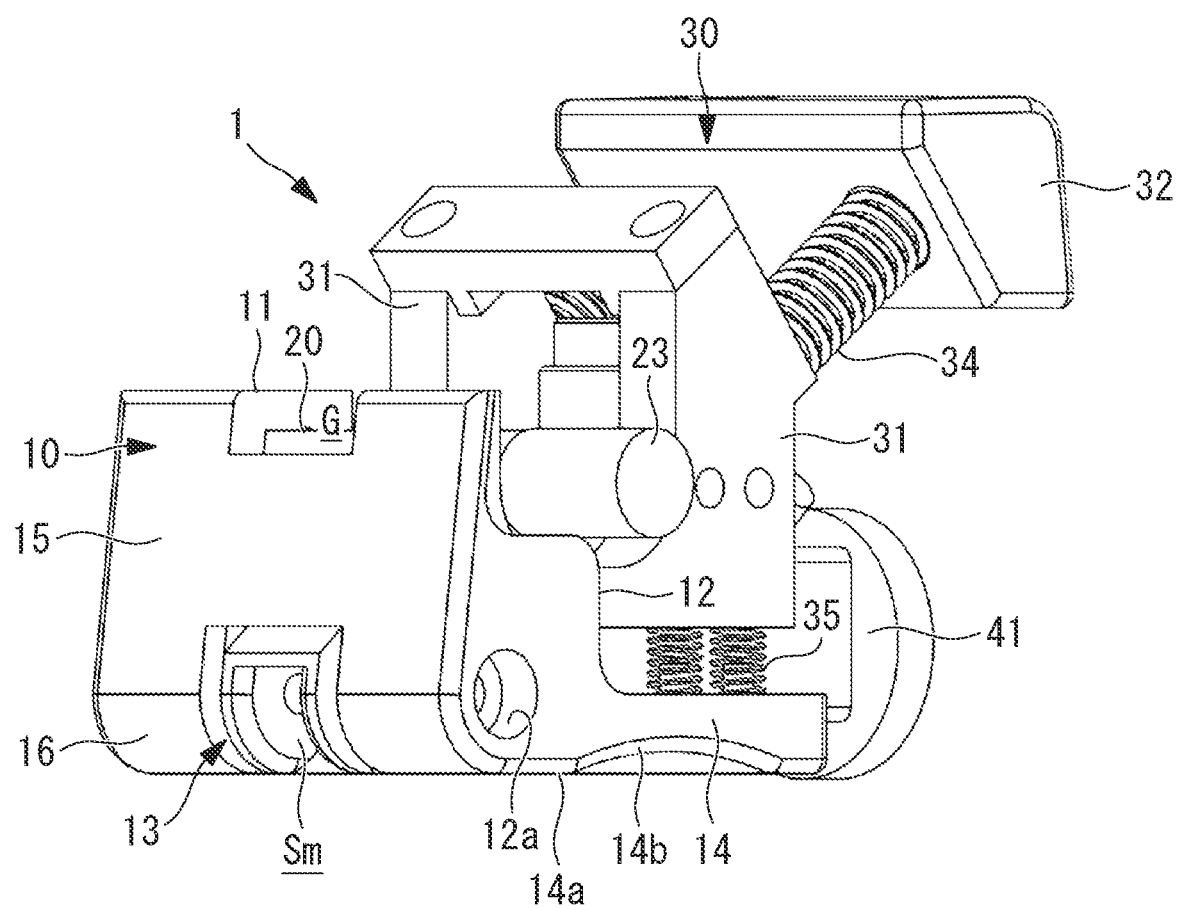
FIG. 4 is a perspective view of the ultrasonic testing device according to one embodiment of the present disclosure when viewed from below.
Figure 5:
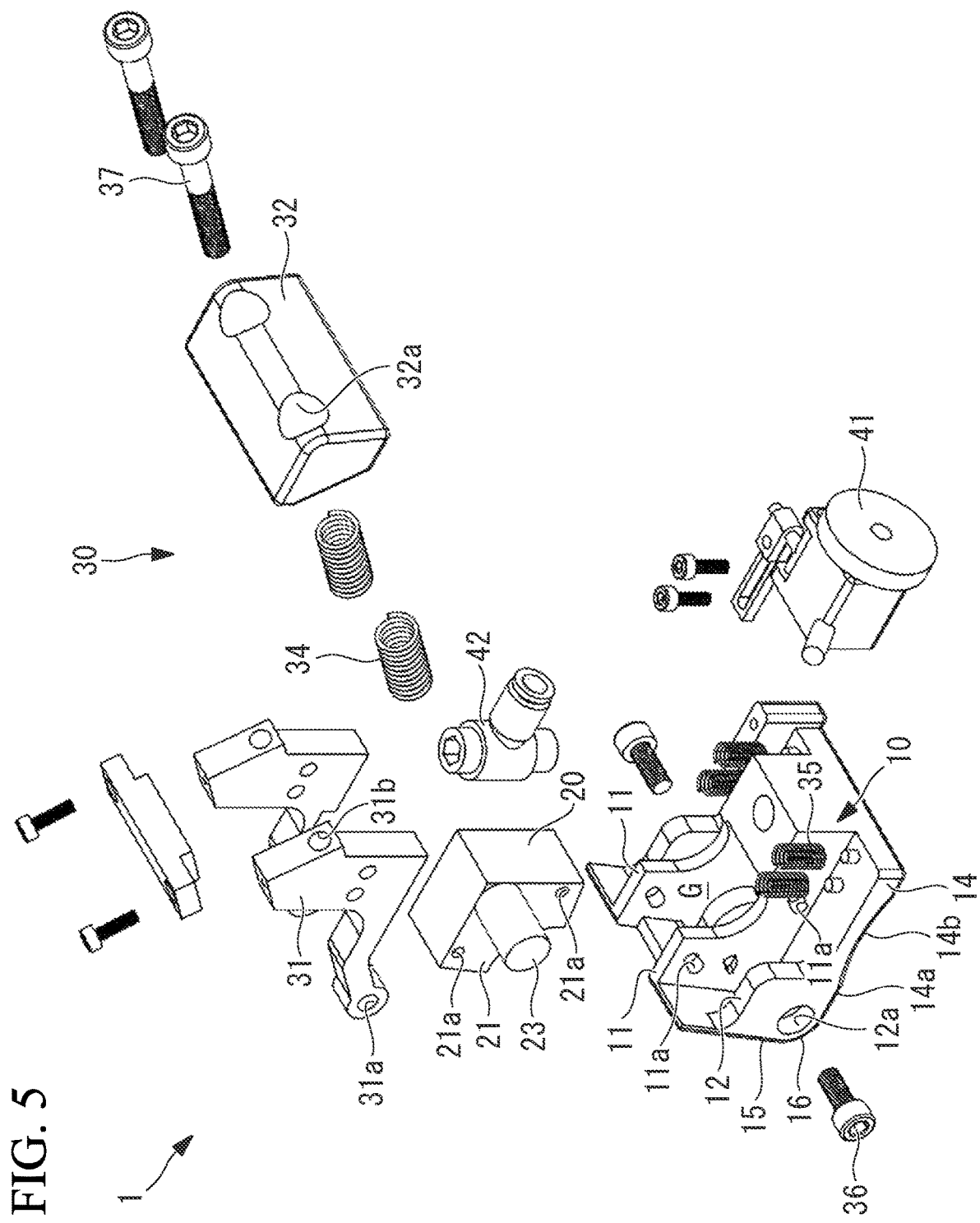
FIG. 5 is an exploded perspective view of the ultrasonic testing device according to one embodiment of the present disclosure.

As illustrated in FIG. 3 to FIG. 5, the ultrasonic testing device 1 has a shoe 10, an ultrasonic array 20, and a forcing unit 30.

The shoe 10 is a resin member having a substantially L-shape in side view. As the resin, glycol-modified polyethylene terephthalate (PETG) is illustrated as an example.

In FIG. 3 to FIG. 5, the lower side of the shoe 10 serves as a grounding part 14. A grounding surface 14a formed on the under surface of the grounding part 14 contacts with a base surface 83 of the stringer 80. The base surface 83 is a portion of the inner circumferential surface 81 connected between the corner 82a and the corner 82b.

A recess 14b is formed in the grounding surface 14a.

The recess 14b is an inverse U-shape portion recessed so as to be spaced apart from the base surface 83. Accordingly, the grounding surface 14a can be configured so as not to come into contact with the base surface 83 in the recess 14b. Note that the shape of the recess 14b is not limited to the illustrated shape.

The grounding part 14 is connected to an erected part 15 via a connecting part 16.

The erected part 15 is a perpendicularly extending portion of the shoe 10.

The connecting part 16 connects the grounding part 14 to the erected part 15 and is in contact with the corner (one corner) 82a. The connecting part 16 has the external shape (outer surface) formed in a circular arc so as to fit to the shape of the corner 82a.

As illustrated in FIG. 5, the shoe 10 has two inner walls 11.

Each inner wall 11 is a wall-shaped portion erected upward in the perpendicular direction from the grounding part 14 and connected to the erected part 15.

Figure 6:
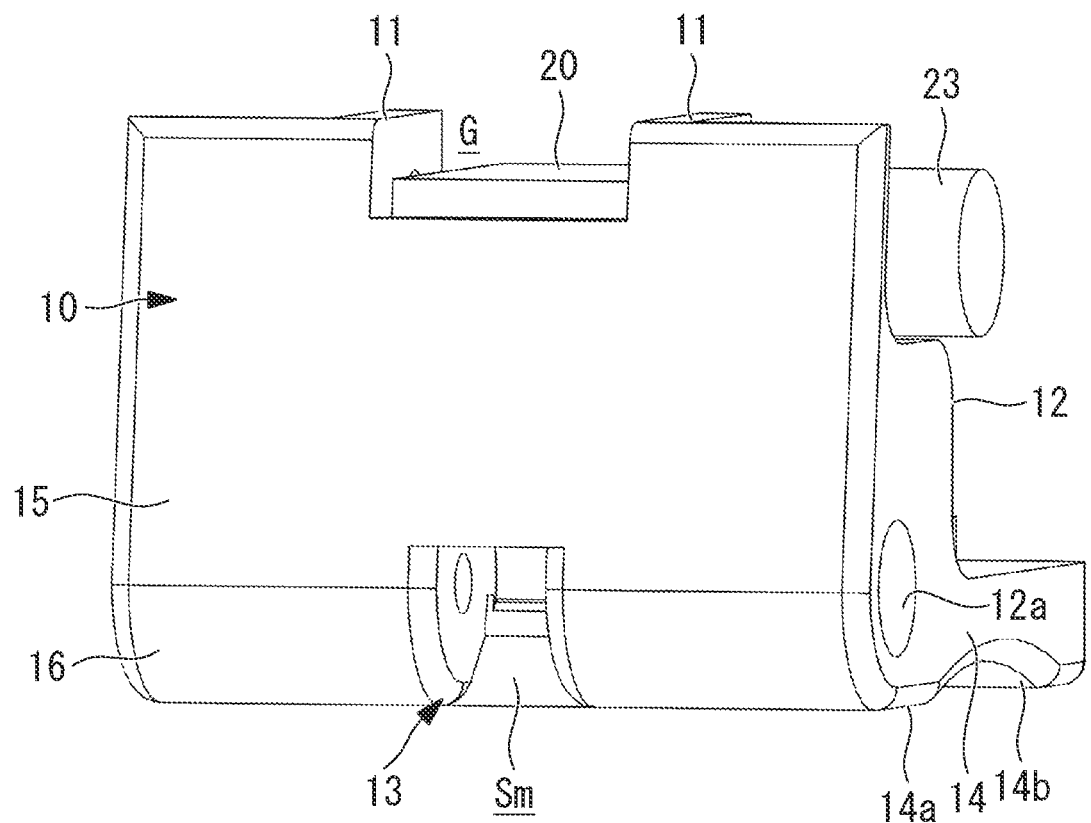
FIG. 6 is a perspective view of a shoe to which an ultrasonic array is attached when viewed from below.

A gap G is provided between the inner walls 11. As illustrated in FIG. 6, the gap G communicates with an opening 13 formed in the connecting part 16. Thus, the gap G communicates with the outside of the shoe 10 via the opening 13. In this state, the opening 13 is formed to face the corner 82a. The ultrasonic array 20 is fitted into the gap G configured in such a way, as illustrated in FIG. 2, FIG. 3, and the like.

As illustrated in FIG. 5, a plurality of (two in FIG. 5) array attachment holes 11a are formed in one of the inner walls 11. Each array attachment hole 11a is a through hole in which a screw for fixing the ultrasonic array 20 is inserted. The array attachment hole 11a is a slot so that the position of the ultrasonic array 20 can be adjusted.

Outer walls 12 are wall-shaped portions erected upward perpendicularly from the grounding part 14 and connected to the erected part 15. One outer wall 12 is provided on each of both the outsides of the inner walls 11.

A counterbored hole 12a is formed in the outer wall 12. The counterbored hole 12a is a stepped through hole through which a shaft of a cap bolt 36 described later is inserted and with which a head of the cap bolt 36 comes into contact.

Figure 7:
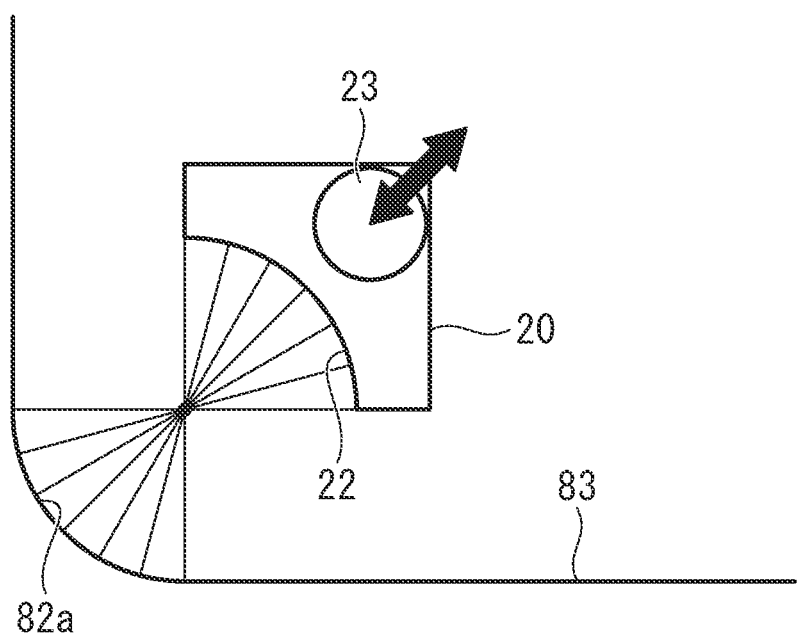
FIG. 7 is a side view illustrating a positional relationship between the ultrasonic array and a corner.

As illustrated in FIG. 5 and FIG. 7, the ultrasonic array 20 is a member with an element arrangement surface 22 formed.

As illustrated in FIG. 7, the element arrangement surface 22 is a circular arc-shaped curved surface facing the corner 82a of the stringer 80.

Many elements are arranged on the element arrangement surface 22. These elements transmit ultrasonic waves to the corner 82a and receive reflected ultrasonic waves. This enables flaw detection inside the stringer 80.

The ultrasonic array 20 is connected to a cable 23 and configured to be able to communicate with a control device or the like (not illustrated).

As illustrated in FIG. 3 and FIG. 5, the ultrasonic array 20 is arranged in the gap G formed between the inner walls 11. In this state, the side surface 21 of the ultrasonic array 20 is covered with the inner wall 11.

A screw hole 21a is formed in the side surface 21 of the ultrasonic array 20. A screw is inserted in an array attachment hole 11a formed in the inner wall 11 and is screwed with the screw hole 21a. Thereby, the ultrasonic array 20 will be attached to the inner wall 11 while interposed between the two inner walls 11.

In this state, as illustrated in FIG. 7, the ultrasonic array 20 is fixed to a position where the radius center of the element arrangement surface 22 matches the radius center of the corner 82a. Note that, since the position of the ultrasonic array 20 is adjustable, it is possible to match the radius center to the corner 82a having various radii even with a constant curvature radius of the element arrangement surface 22.

In the shoe 10 to which the ultrasonic array 20 is attached as illustrated in FIG. 3 and FIG. 5, the connecting part 16 as illustrated in FIG. 1 is brought into contact with the corner 82a of the inner circumferential surface 81, so that the opening 13 formed in the connecting part 16 is closed by the corner 82a. This defines a space (medium space Sm) closed by the inner walls 11, the element arrangement surface 22 of the ultrasonic array 20, and the surface of the corner 82.

The medium space Sm is supplied with a contact medium via a joint 42. The supplied contact medium is then enclosed in the closed medium space Sm, which can configure the pulse-echo ultrasonic testing device 1 in which modified immersion (bubbler) is realized by the medium space Sm.

Herein, the contact medium is a medium that facilitates propagation of ultrasonic waves and may be a liquid such as water or an oil as an example.

Note that, as illustrated in FIG. 3, it is possible to improve liquid tightness by setting the height size of the inner wall 11 so that the inner wall 11 has a height exceeding the side surface 21 of the ultrasonic array 20 with the ultrasonic array 20 being attached.

Further, as illustrated in FIG. 6, the width size of the opening 13 is matched to the width size of the ultrasonic array 20, and this reduces a risk of leakage of a large amount of contact medium enclosed in the medium space Sm out of the opening 13 due to an unnecessarily widened opening 13.

As illustrated in FIG. 1 and FIG. 2, the forcing unit 30 is a mechanism configured to be in contact with the corner (diagonal corner) 82c and push, against the corner 82a, the shoe 10 to which the ultrasonic array 20 is attached.

As illustrated in FIG. 3 to FIG. 5, the forcing unit 30 has arms 31, a diagonal housing 32, and springs (first forcing member) 34.

The arm 31 is a substantially L-shape member provided on each of the outer walls 12 of the shoe 10. The substantially L-shape arm 31 can avoid interference with the cable 23 connected to the ultrasonic array 20.

As illustrated in FIG. 5, a screw hole 31a is formed at the end of the lower side of the arm 31. The cap bolt 36 is inserted in the counterbored hole 12a formed in the outer wall 12 and is screwed therewith. Accordingly, the arm 31 is attached to the outer wall 12 in a pivotable manner.

A screw hole 31b is formed in the end face of the side edge part of the arm 31. The screw hole 31b is a hole with which a cap bolt 37 described later is screwed.

As illustrated in FIG. 1 to FIG. 4, the diagonal housing 32 is connected to the two arms 31 via the springs (first forcing member) 34 and the cap bolt 37.

The diagonal housing 32 is in contact with the corner 82c.

The diagonal housing 32 is formed so as to fit the shapes of the corner 82c and the inner circumferential surface 81 near the corner 82c. In FIG. 1 to FIG. 4, the diagonal housing 32 is a columnar member having a substantially triangular transverse section.

As illustrated in FIG. 3 and FIG. 5, counterbored holes 32a are formed in the diagonal housing 32. Each counterbored hole 32a is a stepped through hole through which the shaft of the cap bolt 37 is inserted and with which the head of the cap bolt 37 comes into contact.

The diagonal housing 32 is fixed to the arms 31 by the cap bolts 37 inserted from the diagonal housing 32 toward the arm 31.

In this state, the springs 34 are interposed between the diagonal housing 32 and the arms 31, the shafts of the cap bolts 37 are inserted in the springs 34, and thereby the diagonal housing 32 is urged in a direction away from the arms 31. Accordingly, the shoe 10 is pushed against the corner 82a by elastic force exerted by the springs 34.

Note that, in the counterbored hole 32a, the inner diameter of a portion in which the shaft of the cap bolt 37 is inserted is larger than the outer diameter of the shaft of the cap bolt 37. This allows the diagonal housing 32 to move smoothly.

As illustrated in FIG. 1 to FIG. 5, in the forcing unit 30, springs (second forcing member) 35 may be interposed between the lower side of the arm 31 and the grounding part 14 of the shoe 10. Accordingly, the grounding part 14 is urged in a direction away from the arms 31, and the grounding part 14 (the grounding surface 14a) can be pushed against the base surface 83 by elastic force exerted by the springs 35.

The ultrasonic testing device 1 configured as described above is used as follows.

As illustrated in FIG. 1 and FIG. 2, the ultrasonic testing device 1 is accommodated in the internal space of the stringer 80. In this state, the connecting part 16 in which the opening 13 is formed is pushed against the corner 82a of the inner circumferential surface 81 by the forcing unit 30, and the grounding surface 14a is pushed against the base surface 83 by the springs 35.

Herein, a contact medium (for example, water) is supplied to the medium space Sm, and the contact medium is enclosed in the medium space Sm. This facilitates propagation of ultrasonic waves between the ultrasonic array 20 and the corner 82a.

In such a state, the ultrasonic testing device 1 is moved in the longitudinal direction of the stringer 80, so that an internal flaw of the stringer 80 near the corner 82a can be inspected over an extent of the longitudinal direction of the stringer 80.

Note that a rotary encoder 41 is provided on the ultrasonic testing device 1, and the position of the ultrasonic testing device 1 in the longitudinal direction can be acquired and recognized.

According to the present embodiment, the following advantageous effects are achieved.

The embodiment includes: the shoe 10 configured to be in contact with the corner 82a; an ultrasonic array 20 configured to be fixed to the shoe 10 to define, together with the shoe 10 and the corner 82a, the medium space Sm in which a contact medium used for propagating an ultrasonic wave is enclosed, and configured to transmit an ultrasonic wave to the corner 82a and receive an ultrasonic wave reflected by the corner 82a; and a forcing unit 30 configured to be in contact with the corner 82c and push the shoe 10 against the corner 82a. Thus, in a modified immersion (bubbler) method using a contact medium enclosed in the medium space Sm, it is possible to perform flaw detection while pressing the shoe 10 against the corner 82a by the forcing unit 30. Therefore, flaw detection can be performed with the shoe 10 being suitably pressed against the corner 82a even when there is a change in the transverse sectional shape of the inner circumferential surface 81 of the stringer 80.

Further, since the modified immersion (bubbler) method is employed, it is not required to submerge the stringer 80 in a water tank, and this eliminates the need for removal operation of air bubbles attached to the surface of the stringer 80 or transportation and positioning operation of the stringer 80.

Further, in the modified immersion (bubbler) method using a contact medium enclosed in the medium space Sm, consumables are not necessary, unlike in the case of using gel pads or the like, for example. Therefore, cost for secondary materials can be reduced.

Further, since the ultrasonic array 20 is provided on the shoe 10 in a movable manner, the radius center of the element arrangement surface 22 can be matched to the radius center of the corner 82a even when there is a change in the radius of the corner 82a, and the ultrasonic wave can be suitably reflected.

Further, the arm 31 is connected to the shoe 10 in a pivotable manner, and therefore, even when there is a change in the positional relationship between the corner 82a and the corner 82c, such a change can be absorbed by pivot movement of the arm 31.

Further, the recess 14*b* recessed in a direction away from the base surface 83 is formed in the grounding surface 14*a*, and therefore, even when a protrusion, a bump, or the like is formed on the base surface 83, it is possible to move the ultrasonic testing device 1 while avoiding such a protrusion, a bump, or the like.

Further, the spring 35 is provided to apply force to the arm 31 and the grounding part 14 in directions in which the arm 31 and the grounding part 14 move away from each other, and therefore flaw detection can be performed with the grounding surface 14*a* formed on the grounding part 14 being suitably pressed against the base surface 83 of the stringer 80.

The ultrasonic testing device and the testing method according to one embodiment as described above are recognized as follows, for example.

The ultrasonic testing device (1) according to one aspect of the present disclosure performs flaw detection on a test object (80) having an inner circumferential surface (81) of a substantially rectangular shape closed in a transverse section. The ultrasonic testing device includes: a shoe (10) configured to be in contact with one corner (82*a*) of the inner circumferential surface of the test object; an ultrasonic array (20) configured to be fixed to the shoe to define, together with the shoe and the one corner, a medium space (Sm) in which a contact medium used for propagating an ultrasonic wave is enclosed, and configured to transmit an ultrasonic wave to the one corner and receive a reflected ultrasonic wave; and a forcing unit (30) configured to be in contact with a diagonal corner (82*c*) to the one corner and push the shoe against the one corner.

According to the ultrasonic testing device of the present aspect, the ultrasonic testing device includes: the shoe configured to be in contact with one corner of the inner circumferential surface of the test object; the ultrasonic array configured to be fixed to the shoe to define, together with the shoe and the one corner, the medium space in which a contact medium used for propagating an ultrasonic wave is enclosed, and configured to transmit an ultrasonic wave to the one corner and receive a reflected ultrasonic wave; and the forcing unit configured to be in contact with the diagonal corner to the one corner and push the shoe against the one corner. Thus, in a modified immersion (bubbler) method using a contact medium enclosed in the medium space, it is possible to perform flaw detection while pressing the shoe against the corner of the test object by the forcing unit. Therefore, flaw detection can be performed with the shoe being suitably pressed against the corner of the test object even when there is a change in the transverse sectional shape of the inner circumferential surface of the test object.

Further, since the modified immersion (bubbler) method is employed, it is not required to submerge the test object in a water tank, and this eliminates the need for removal operation of air bubbles attached to the surface of the test object or transportation and positioning operation of the test object.

Further, in the modified immersion (bubbler) method using a contact medium enclosed in the medium space, consumables are not necessary, unlike in the case of using gel pads or the like, for example. Therefore, cost for secondary materials can be reduced.

Further, in the ultrasonic testing device according to one aspect of the present disclosure, the ultrasonic array is provided on the shoe in a movable manner.

In the ultrasonic testing device according to the present aspect, since the ultrasonic array is provided on the shoe in a movable manner, ultrasonic waves can be suitably reflected even when there is a change in the radius of the one corner.

Further, in the ultrasonic testing device according to one aspect of the present disclosure, the shoe has a grounding part (14) including a grounding surface (14*a*) that is in contact with a base surface (83) of the test object connected to the one corner, two walls (11) covering both side surfaces (21) of the ultrasonic array and defining the medium space, and an opening (13) facing the one corner and communicating with the medium space between the two walls.

In the ultrasonic testing device according to the present aspect, the shoe has the grounding part including the grounding surface that is in contact with the base surface of the test object connected to the one corner, the two walls covering both side surfaces of the ultrasonic array and defining the medium space, and the opening facing the one corner and communicating with the medium space between the two walls. Thus, the test object can be stably grounded by the grounding surface, and the medium space can be defined in a simple manner by the two walls, the one corner, and the ultrasonic array.

Further, in the ultrasonic testing device according to one aspect of the present disclosure, the forcing unit has an arm (31) connected to the shoe in a pivotable manner, a diagonal housing (32) configured to be in contact with the diagonal corner, and a first forcing member (34) configured to apply force to the arm and the diagonal housing in directions in which the arm and the diagonal housing move away from each other.

In the ultrasonic testing device according to the present aspect, the forcing unit has the arm connected to the shoe in a pivotable manner, the diagonal housing configured to be in contact with the diagonal corner, and the first forcing member configured to apply force to the arm and the diagonal housing in directions in which the arm and the diagonal housing move away from each other. Thus, the shoe can be pressed against the corner of the test object by the first forcing member. Further, the arm is connected to the shoe in a pivotable manner, and therefore, even when there is a change in the positional relationship between the one corner and the diagonal corner, such a change can be absorbed by pivot movement of the arm.

Further, in the ultrasonic testing device according to one aspect of the present disclosure, a recess (14*b*) recessed in a direction away from the base surface is formed in the grounding surface.

In the ultrasonic testing device according to the present aspect, since the recess recessed in the direction away from the base surface is formed in the grounding surface, even when a protrusion, a bump, or the like are formed on the base surface, it is possible to move the ultrasonic testing device while avoiding such a protrusion, a bump, or the like.

Further, the ultrasonic testing device according to one aspect of the present disclosure includes a second forcing member (35) configured to apply force to the arm and the grounding part in directions in which the arm and the grounding part move away from each other.

In the ultrasonic testing device according to the present aspect, since the second forcing member is provided to apply force to the arm and the grounding part in the directions in which the arm and the grounding part move away from each other, flaw detection can be performed in a state where the grounding surface formed on the grounding part is suitably pressed against the base surface of the test object.

Further, the testing method of a test object according to one aspect of the present disclosure uses an ultrasonic testing device. The ultrasonic testing device includes a shoe configured to be in contact with one corner of an inner circumferential surface of the test object having the inner circumferential surface of a substantially rectangular shape closed in a transverse section, an ultrasonic array configured to be fixed to the shoe to define, together with the shoe and the one corner, a medium space in which a contact medium used for propagating an ultrasonic wave is enclosed, and configured to transmit an ultrasonic wave to the one corner and receive an ultrasonic wave reflected by the one corner, and a forcing unit configured to be in contact with a diagonal corner to the one corner and push the shoe against the one corner. The testing method includes a step of performing flaw detection in a state where the shoe is in contact with the one corner of the test object and a contact medium is enclosed in the medium space.

LIST OF REFERENCE SYMBOLS 1 ultrasonic testing device
10 shoe
11 inner wall
11a array attachment hole
12 outer wall
12a counterbored hole
13 opening
14 grounding part
14a grounding surface
14b recess
15 erected part
16 connecting part
20 ultrasonic array
21 side surface
21a screw hole
22 element arrangement surface
23 cable
30 forcing unit
31 arm
31a screw hole
31b screw hole
32 diagonal housing
32a counterbored hole
34 spring (first forcing member)
35 spring (second forcing member)
36 cap bolt
37 cap bolt
41 rotary encoder
42 joint
80 stringer (test object)
81 inner circumferential surface
82a corner (one corner)
82b corner
82c corner (diagonal corner)
82d corner
83 base surface

What is claimed is:

1. An ultrasonic testing device that performs flaw detection on a test object having an inner circumferential surface of a substantially rectangular shape closed in a transverse section, the ultrasonic testing device comprising:

a shoe configured to be in contact with one corner of the inner circumferential surface of the test object;
an ultrasonic array configured to be fixed to the shoe to define, together with the shoe and the one corner, a medium space in which a contact medium used for propagating an ultrasonic wave is enclosed, and configured to transmit an ultrasonic wave to the one corner and receive a reflected ultrasonic wave; and
a forcing unit configured to be in contact with a diagonal corner of the one corner and push the shoe against the one corner.

2. The ultrasonic testing device according to claim 1, wherein the ultrasonic array is provided on the shoe in a movable manner.

3. The ultrasonic testing device according to claim 1, wherein the shoe includes
a grounding part including a grounding surface that is in contact with a base surface of the test object connected to the one corner,
two walls covering both side surfaces of the ultrasonic array and defining the medium space, and
an opening facing the one corner and communicating with the medium space between the two walls.

4. The ultrasonic testing device according to claim 3, wherein the forcing unit includes
an arm connected to the shoe in a pivotable manner,
a diagonal housing configured to be in contact with the diagonal corner, and
a first forcing member configured to apply force to the arm and the diagonal housing in directions in which the arm and the diagonal housing move away from each other.

5. The ultrasonic testing device according to claim 4, wherein, in the grounding surface, a recess recessed in a direction away from the base surface is formed.

6. The ultrasonic testing device according to claim 4, wherein the forcing unit further comprises a second forcing member configured to apply force to the arm and the grounding part in directions in which the arm and the grounding part move away from each other.

7. A testing method of a test object using an ultrasonic testing device comprising
a shoe configured to be in contact with one corner of an inner circumferential surface of the test object having the inner circumferential surface of a substantially rectangular shape closed in a transverse section,
an ultrasonic array configured to be fixed to the shoe to define, together with the shoe and the one corner, a medium space in which a contact medium used for propagating an ultrasonic wave is enclosed, and configured to transmit an ultrasonic wave to the one corner and receive an ultrasonic wave reflected by the one corner, and
a forcing unit configured to be in contact with a diagonal corner of the one corner and push the shoe against the one corner,
the testing method comprising a step of:
performing flaw detection in a state where the shoe is in contact with the one corner of the test object and a contact medium is enclosed in the medium space.

* * * * *